US006943657B2

(12) United States Patent
Subramanian et al.

(10) Patent No.: US 6,943,657 B2
(45) Date of Patent: Sep. 13, 2005

(54) SOLENOID AND VALVE ASSEMBLY HAVING A LINEAR OUTPUT

(75) Inventors: Viswanathan Subramanian, El Paso, TX (US); Conrado Carrillo, Chihuahua (MX)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/704,963

(22) Filed: Nov. 10, 2003

(65) Prior Publication Data

US 2005/0099256 A1 May 12, 2005

(51) Int. Cl.[7] ................................................ H01F 3/00
(52) U.S. Cl. ................................ 335/261; 251/129.15
(58) Field of Search ................................ 335/220–234, 335/250–251, 255–262, 281–282; 251/129.01–129.19

(56) References Cited

U.S. PATENT DOCUMENTS 6,182,646 B1 * 2/2001 Silberstein et al. ..... 123/568.26

* cited by examiner

Primary Examiner—Lincoln Donovan

(74) Attorney, Agent, or Firm—Jimmy L. Funke

(57) ABSTRACT

A solenoid assembly is used with a valve assembly to regulate the flow of fluid therethrough. The solenoid assembly includes a solenoid frame extending between a first end and a second end. A primary plate is disposed adjacent the first end of the solenoid frame. The primary plate includes a flux concentrating cylinder extending out therefrom. A secondary plate is disposed adjacent the second end of the solenoid frame. A bobbin is disposed within the solenoid frame between the primary and secondary plates. The bobbin defines a core and has a wire coil wrapped about the core. The wire coil receives an electric current to induce a magnetic field thereabout. The solenoid assembly also includes a plunger that is extendable through a portion of the core of the bobbin and is movable at a defined force with respect to the bobbin. The plunger moves in response to changes in the magnetic field. The plunger includes a flux extension extending out therefrom coaxially with the plunger. The flux extension includes a relief portion cut out of the flux extension to change the force created by the plunger as it moves through the core.

19 Claims, 6 Drawing Sheets

SOLENOID AND VALVE ASSEMBLY HAVING A LINEAR OUTPUT

BACKGROUND ART

1. Field of the Invention

The invention relates to an electromagnetic actuator used in conjunction with a fluid-flow regulating valve. More specifically, the invention relates to an electromagnetic actuator that will produce a substantially linear pressure output of a fluid regulating valve.

2. Description of the Related Art

Actuators are used to move devices, or elements thereof, between positions of operation. By way of example, an actuator may move a switch from an open condition to a closed condition. Actuators may also move elements between a plurality of positions. In the case where an actuator operates a valve, a valve may move between open and closed positions. In addition, the actuator may move the valve to a plurality of positions between the open and closed position to regulate the flow of material, i.e., fluid flow, as it passes through the valve by varying the size of the opening created within the valve.

When controlling the flow of fluid, it is important to control the pressure of the fluid as it flows through the valve. It is desired to operate the pressure control valves to minimize the pump flow by specifying zero flow at the minimum current condition and zero flow at the maximum current condition. These parameters create a flow curve that is bell-shaped in nature. In addition, a linear pressure curve is desired. In a linear pressure curve, the pressure may go from zero to a higher value in a normally closed condition, whereas it will go from a high value to zero in a normally open condition.

Typically, for pressure control valves, the magnetic force position curve is designed to be as flat as possible relative to the position of the valve such that the force varies only as a function of the current of the fluid flowing therebetween. For a valve with a bell-shaped flow curve, this is not a suitable solution because the resistance force to valve movement is not linear. The curve in the flow pressure leads to a lack of resolution and linearity of the pressure control curve valve, which is not desirable. Therefore, there is a need to design a solenoid valve that can regulate fluid flow by having a magnetic flow position curve that matches the flow resistance curves of the fluid. Such a design will achieve a balance throughout the available current domain and the balance is uniform.

SUMMARY OF THE INVENTION

A solenoid assembly is used with a valve to regulate the flow of fluid therethrough. The solenoid assembly includes a solenoid frame extending between a first end and a second end. A primary plate is disposed adjacent the first end of the solenoid frame. The primary plate includes a flux concentrating cylinder extending out therefrom. A secondary plate is disposed adjacent the second end of the solenoid frame. A bobbin is disposed within the solenoid frame between the primary and secondary plates. The bobbin defines a core and has a wire coil wrapped about the core. The wire coil receives an electric current to induce a magnetic field thereabout. The solenoid assembly also includes a plunger that is extendable through a portion of the core of the bobbin and is movable at a defined force with respect to the bobbin. The plunger moves in response to changes in the magnetic field. The plunger includes a flux extension extending out therefrom coaxially with the plunger. The flux extension includes a relief portion cut out of the flux extension to change the force created by the plunger as it moves through the core.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE PREFERRED EMBODIMENT

Figure 1A:
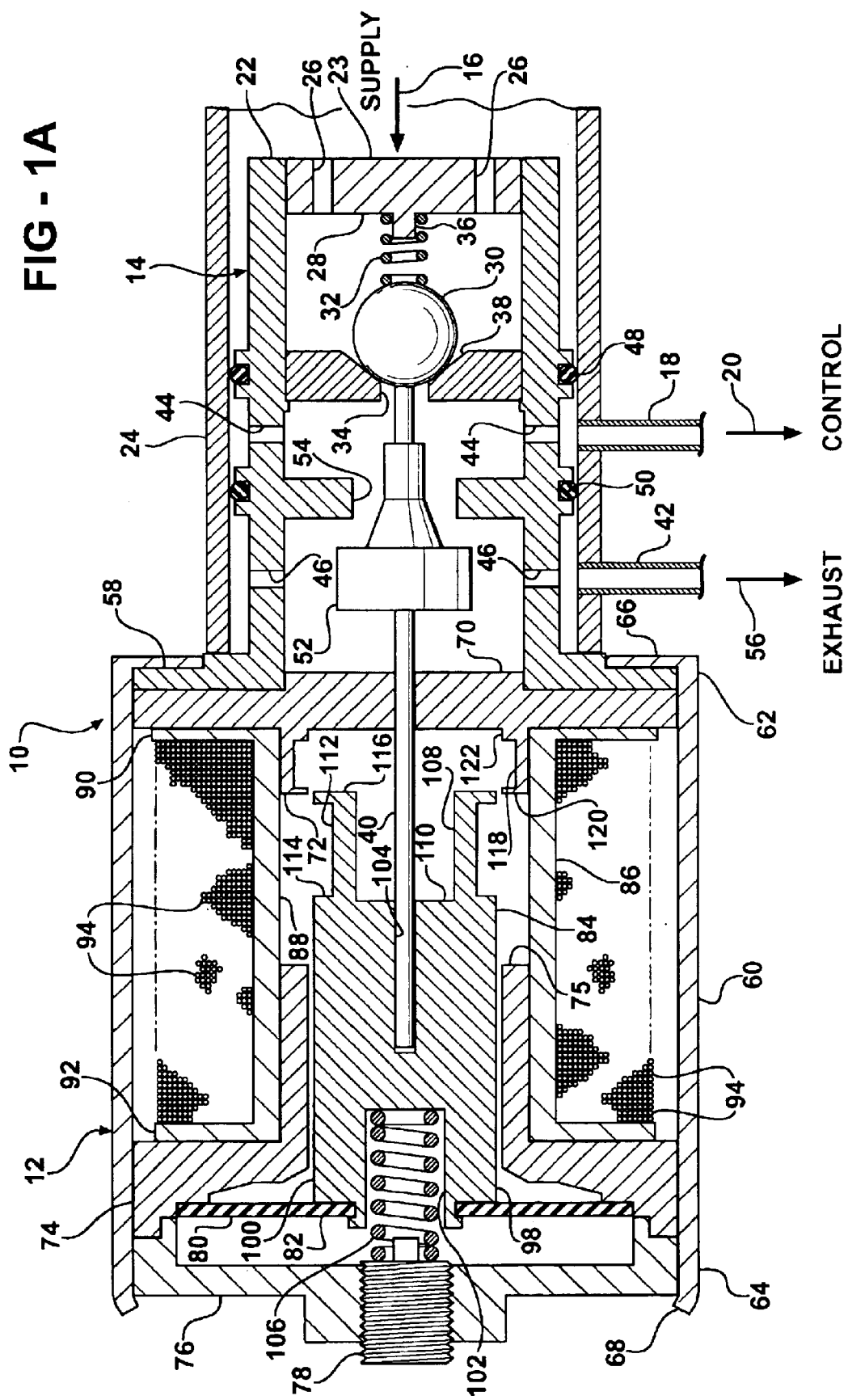
FIG. 1A is a cross-sectional side view of one embodiment of the invention with the valve closed preventing fluid from flowing therethrough.

Referring to FIG. 1A, a solenoid and valve assembly is generally indicated at 10. The solenoid and valve assembly 10 includes a solenoid assembly, generally shown at 12 and a valve assembly, generally shown at 14. The solenoid assembly 12 operates the valve assembly 14 to move elements of the valve assembly 14 between a normally closed position and an open position to allow fluid, represented by supply lines 16 to pass through a control port 18 when it is determined that the pressure of control fluid 20 exiting the control port 18 needs to be maintained or increased.

The valve assembly 14 includes a valve frame 22. The valve frame 22 is mounted within an enclosure 24 that supplies the fluid 16 to be regulated. The valve frame 22 defines a valve end 23. The enclosure 24 is shown to be a bore in the Figures. It should be apparent to those skilled in the art that the enclosure 24 may be any type of fluid handling or holding system.

The valve frame 22 includes inlet ports 26 that allow the supply fluid 16 to enter a first chamber 28. A ball poppet 30 is biased by a closure spring 32 to close a first aperture 34 in the valve frame 22. A spring stem 36 holds the closure spring 32 in a position directly opposite the ball poppet 30 as it rests in a chamfered neck 38 of the first aperture 34. The combination of the spring force of the closure spring 32 and the pressure of the supply fluid 16 is sufficient to prevent the supply fluid 16 from passing through the first aperture 34. When a force is generated by the solenoid assembly 12, a rod 40 forces the ball poppet 30 out of its seated position in the chamfered neck 38 of the first aperture 34. When the ball poppet 30 is pushed away from the chamfered neck 38 (to the right as is oriented in FIGS. 1A and 1B), the supply fluid 16 passes through the first aperture 34 and is allowed to exit through either the control port 18 or an exhaust port 42.

A first set of holes 44 and a second set of holes 46 allow the supply fluid 16 to pass through the valve frame 22 and out the control port 18 and the exhaust port 42. Two O-rings 48, 50 prevent the supply fluid 16 that exits the second set of holes 46 from mixing with the supply fluid 16 that passes through the first set of holes 44. The O-rings 48, 50 also prevent the supply fluid 16 from bypassing the valve assembly 14 to immediately exit the enclosure 24 via the control 18 and exhaust 42 ports.

Figure 1B:
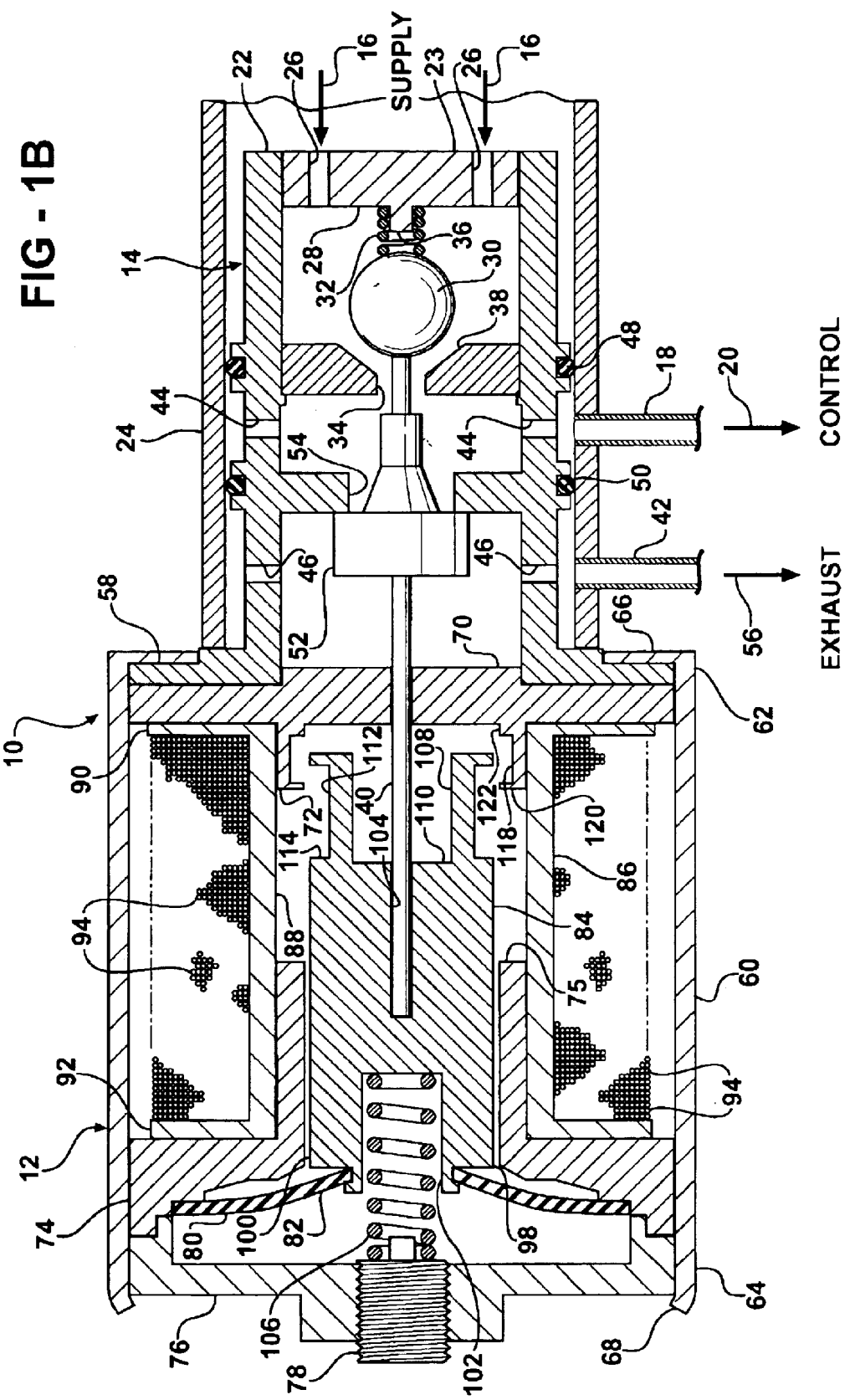
FIG. 1B is a cross-sectional side view of the invention with the valve in the open position allowing fluid flow therethrough.

A poppet 52 is fixedly secured to the rod 40 between the solenoid assembly 12 and the ball poppet 30. The poppet 52 moves along with the rod 40 between an open position, as shown in FIG. 1A, and a closed position, as shown in FIG. 1B. In the open position, the supply fluid 16 is allowed to pass through a second aperture 54 at the same time the supply fluid 16 is flowing through the first aperture 34. Exhaust fluid, represented by arrow 56 leaves the enclosure 24 at the same time control fluid 20 is generating pressure.

The valve frame 22 includes a valve flange 58 that is received by the solenoid assembly 12. The valve flange 58 secures the valve frame 22 to the solenoid assembly 12 and is appropriately sealed to prevent as much exhaust fluid 56 from entering the solenoid assembly 12.

The solenoid assembly 12 includes a solenoid frame 60. In the embodiment shown in the Figures, the solenoid frame 60 is cylindrical in shape. It should, however, be appreciated by those skilled in the art that the solenoid frame 60 may be configured in any shape to satisfy the manufacturing requirements of the item into which the solenoid and valve assembly 10 are to be secured. The solenoid frame extends between a first end 62 and a second end 64. The first end 62 includes a receiving flange 66 that receives the valve flange 58 allowing the solenoid frame 60 to hold the valve frame 22 in place. The second end 64 of the solenoid frame 60 has a reduced diameter with respect to the rest of the solenoid frame 60. In the embodiment shown in the Figures, the second end 64 includes a tapered edge 68 which helps keep the elements of the solenoid assembly 12 within the solenoid frame 60. It should be appreciated by those skilled that the tapered edge 68 can be replaced with a flange or similar structure to prevent movement of the components of the solenoid assembly 12 within the solenoid frame 60.

The solenoid assembly 12 also includes a primary plate 70. The primary plate 70 is designed to abut the valve flange 58 of the valve assembly 14. Therefore, the valve flange 58 is disposed between the receiving flange 66 and the primary plate 70. The primary plate 70 extends around the entire circumference of the solenoid frame 60. The primary plate 70 includes a flux concentrating cylinder 72 extending out therefrom. The flux concentrating cylinder 72 is concentric about the rod 40, which defines a longitudinal axis of the solenoid assembly 12. The flux concentrating cylinder 72 will be discussed in greater detail subsequently.

A secondary plate 74 is disposed adjacent the second end 64 of the solenoid frame 60. The secondary plate 74 includes a core boss 75 that extends inwardly from the secondary plate 74. The core boss 75 will aid in the concentration of the magnetic field, which will be discussed in greater detail subsequently. A cover plate 76 is secured to the second end 64 and is disposed between the tapered edge 68 and the secondary plate 74. Depending on the overall design characteristics of the solenoid assembly 12, the cover plate 76 may or may not be ferromagnetic. A screw 78 threadingly secures the cover plate 76 to a structure, e.g., a transmission casing, to hold the solenoid and valve assembly 10 securely in place. A diaphram 80 is secured to the secondary plate 74 and a plunger 84 to align and center the plunger 84 in the solenoid assembly 12. An inner portion 82 of the diaphram 80 is secured to a plunger 84, which will be discussed in greater detail subsequently.

A bobbin 86 is disposed within the solenoid assembly 12 and extends between the primary plate 70 and the secondary plate 74. The bobbin 86 defines a non-magnetic core 88 that is hollow and two side walls 90, 92 extending outwardly from the core 88. A wire coil 94 is wrapped about the core 88. The wire coil 94 is a single wire that is wrapped around the core 88 a number of times. When an electric current is sent through the wire coil 94, a magnetic field is induced that travels in part through the center of the core 88. A portion of the magnetic field is represented by flux lines 96, shown in FIGS. 2A through 2C.

Figure 2A:
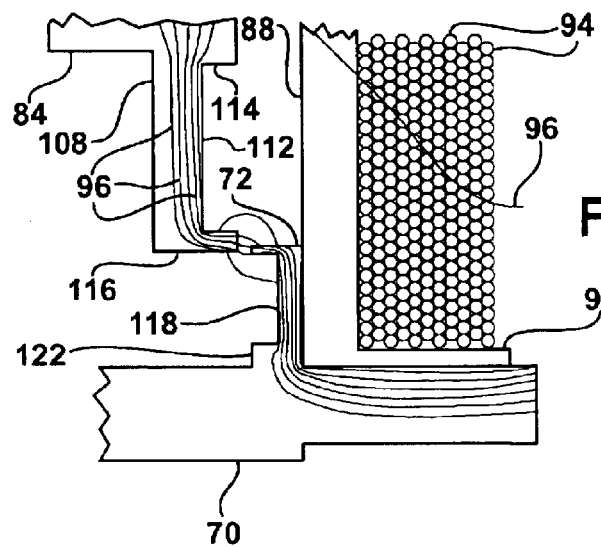
FIG. 2A is a cross-sectional side view, partially cut away showing a portion of the plunger in its normally closed position as it relates to the primary plate and the magnetic field extending therebetween.

When the electric current is not passing through the wire coil 94, the plunger 84 is in a position within the core 88 that is away from the primary plate 70. This position is represented in FIGS. 1A and 2A. In other words, a back end 98 of the plunger 84 is as close as possible to the second end 64 of the solenoid frame 60. The plunger 84 includes a solid cylinder 100 that is fabricated from a ferromagnetic material so that it is susceptible to the magnetic field 96 that is created by the wire coil 94 which passes through the core 88 of the bobbin 86. The cylinder 100 includes a spring recess 102 and a rod recess 104. The rod recess 104 receives the rod 40 therein. The rod 40 is fixedly secured within the rod recess 104, typically through means of a friction fit. A plunger spring 106 extends between the cover plate 76 and the plunger 84. The plunger spring 106 extends into the spring recess 102 of the plunger 84. The plunger spring 106 is used to stabilize the plunger 84 and smooth out any return motion that the plunger 84 may move through when the electric current is removed from the wire coil 94. The plunger spring 106 also sets the opening point of the valve assembly 14.

The plunger 84 also includes a flux extension 108 that extends out from a front end 110 of the cylinder 100 coaxially with the cylinder 100. The flux extension 108 is used to concentrate the magnetic field as it passes through the portion of the core 88 that does not include the cylinder 100 therein.

The flux extension 108 includes a relief portion 112 cut out of the flux extension 108. The relief portion 112 extends through a portion of the flux extension 108. More specifically, the flux extension 108 extends between a plunger end 114 and a distal end 116. The flux extension 108 has a predetermined width at the plunger end 114 and the distal end 116. The relief portion 112 is cut out of the flux extension 108 between the plunger 114 and distal 116 ends such that the flux extension 108 has a reduced width at the portion between the two ends 114, 116.

Returning attention to the flux concentration cylinder 72, a flux recess 118 is cut out from the flux concentrating cylinder 72 along a portion thereof. The flux recess 118 complements the relief portion 112 of the flux extension 108. The flux recess 118 helps further control the magnetic field allowing control over the force created by the plunger 84 as it moves through the core 88. Like the relief portion 112 of the flux extension 108, the flux recess 118 is cut out of a portion of the flux concentrating cylinder 72 between an inward end 120 and a plate end 122. The inward end 120 extends into the core 88 whereas the plate end 122 is disposed adjacent the primary plate 70.

Figure 2B:
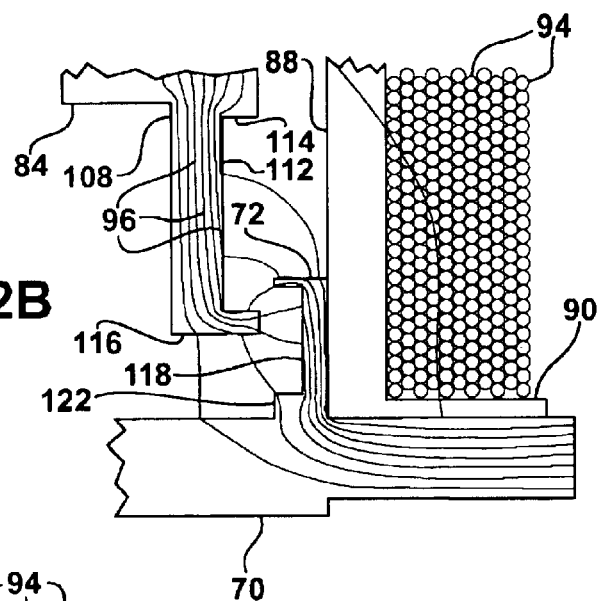
FIG. 2B is a cross-sectional side view, partially cut away showing a portion of the plunger moving away from the normally closed position as it relates to the primary plate and the magnetic field extending therebetween.
Figure 2C:
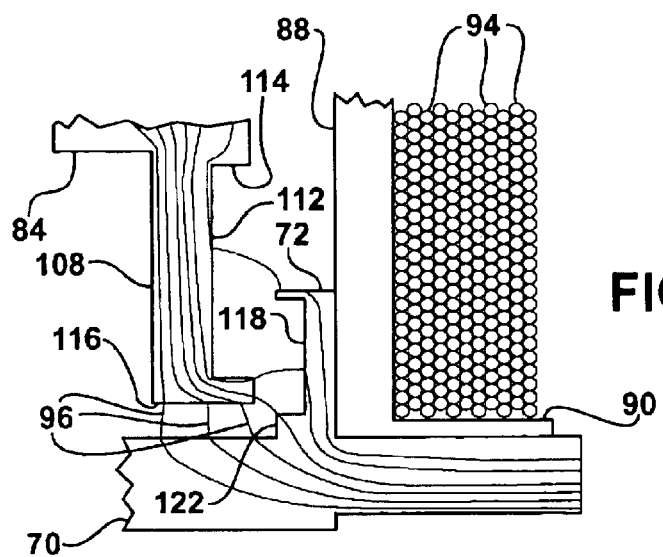
FIG. 2C is a cross-sectional side view, partially cut away showing a portion of the plunger in its fully open position as it relates to the primary plate and the magnetic field extending therebetween.

Referring specifically to FIGS. 2A through 2C, travel of the plunger 84 as it passes from a moment when the electric current is passed through the wire coil 94 is shown in three stages. The first stage is shown in FIG. 2A where the electric current is initially passed through the wire coil 94. In this Figure, it can be seen that the magnetic flux lines 96 are concentrated and as they travel through the distal end 116 of the flux extension 108 and the inward end 120 of the flux concentrating cylinder 72. This increases the force of the magnetic field to a level commensurate with the requirement to overcome the force generated by the supply fluid 16 as it pushes on the ball poppet 30. Once the plunger moves pass its initial non-actuated state, the distal end 116 of the flux extension does not correlate with the inward end 120 of the flux concentrating cylinder 72, resulting in a greater distance between the fluid concentrating cylinder 72 and flux extension 108. This results in the magnetic field being weakened due to the fact that there is a larger space between the flux extension 108 and the flux concentrating cylinder 72. As is shown in FIG. 2B, the magnetic flux lines 96 are spread out and not as concentrated as they were at the initial point in FIG. 2A. As the plunger 84 continues toward its fully actuated position, FIG. 2C, the magnetic flux lines 96 are concentrated in the primary plate 70 and the distance between the flux extension 108 and the primary plate 70 is reduced due to the distal end 116 approaching the plate end 122 of the flux concentrating cylinder 72 and the primary plate 70 itself. Again, at this time, the magnetic field is concentrated through the plunger 84 allowing the plunger 84 to generate a force to close the valve assembly 14 that is greater than that when the plunger 84 was passing through from its non-actuated state to its fully actuated state.

Figure 3:
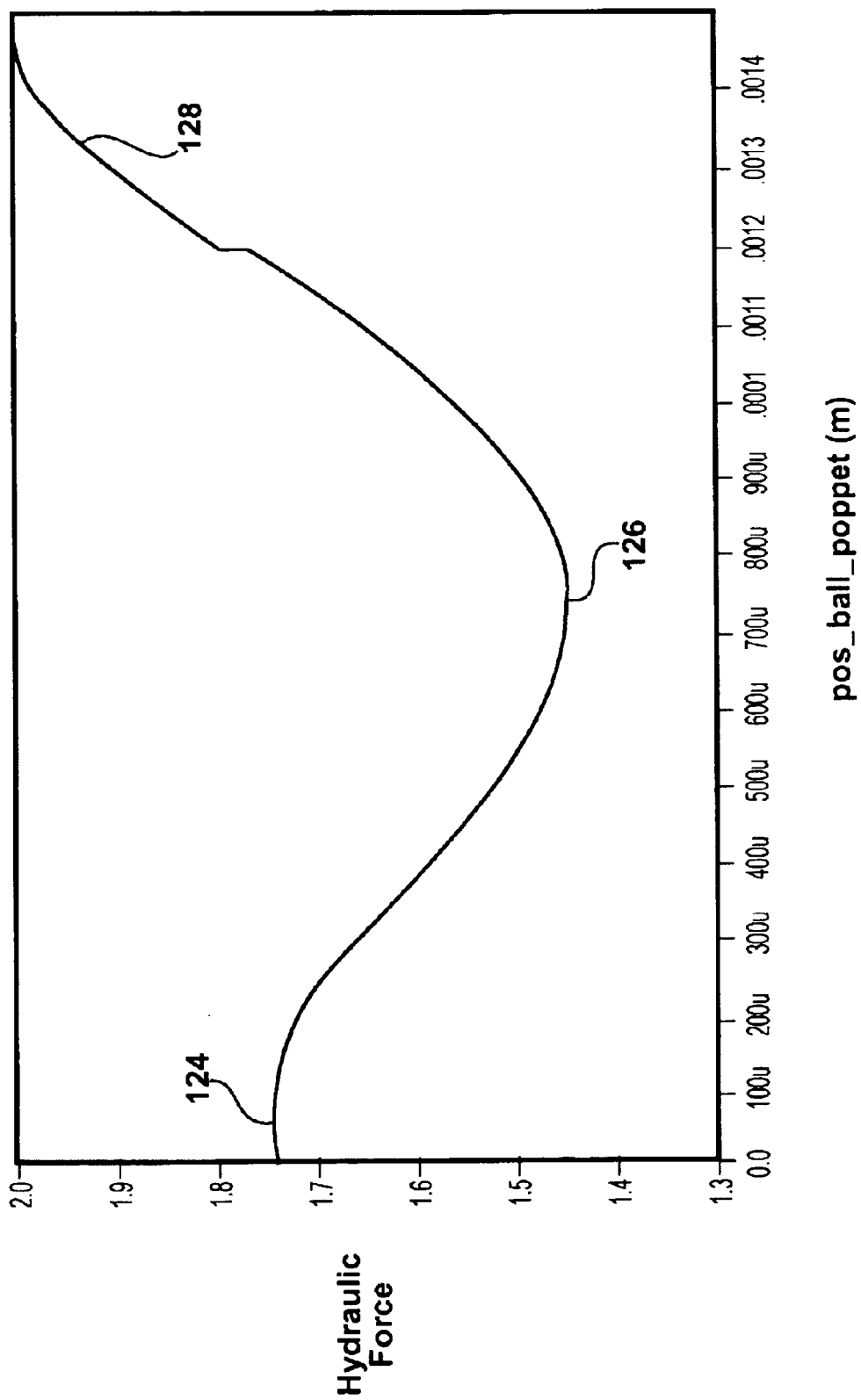
FIG. 3 is a graph representing the hydraulic force applied against the solenoid as the position of the ball poppet varies.

Referring to FIG. 3, a graph represents the force generated by the hydraulic fluid going through the first aperture 34 as the ball poppet 30 moves out of the chamfered neck 38 toward the valve end 23. Initially, the force is relatively steady at a portion 124 in the graph. Once the pressure of the supply fluid 16 is dissipated due to the flow of the supply fluid 16 through the first aperture 34, the force is reduced to a minimum 126 toward the middle of the movement of the plunger 84. Force is increased at 128 in the graph as the plunger 84 approaches its fully actuated position. At this position, the plunger 84 must overcome forces generated by the exhaust damper 52 closing the second aperture 54. In addition, the plunger 84 must overcome the force generated by the closure spring 32 that is being compressed by the ball poppet 30 as it moves toward a fully opened position disposed adjacent the valve end 23. This is why the force required at the end of the plunger 84 is greater than that at the beginning of the plunger 84 travel.

Figure 4:
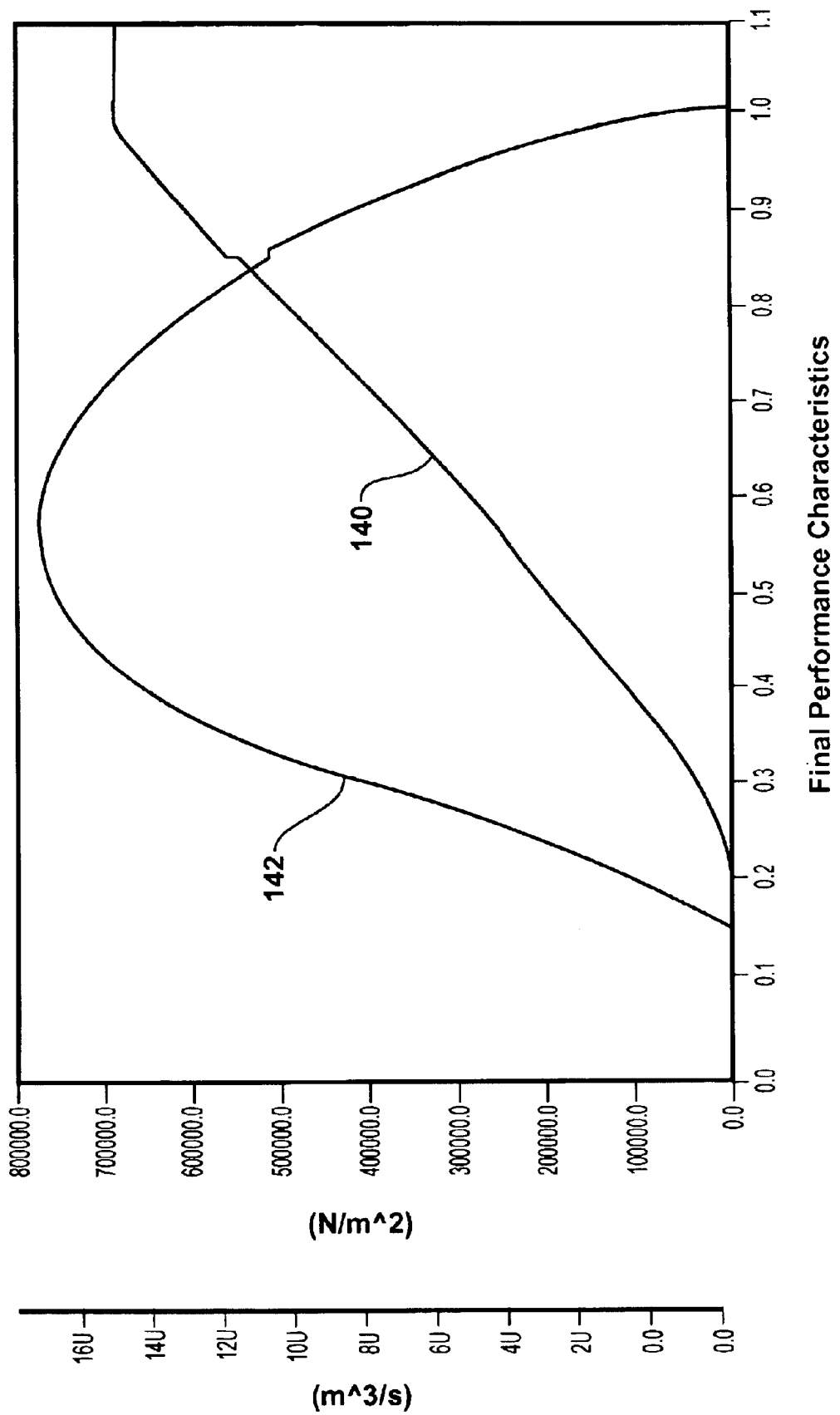
FIG. 4 is a graphic representation of the force per area and the volume per time performance characteristics of the solenoid.

By utilizing the relief portion 112 in the flux extension 108 and the flux recess 118 in the flux concentrating cylinder 72, the pressure created by the plunger 84 becomes generally linear, as is represented by line 140 in FIG. 4. This line is superimposed over a bell-shaped flow curve 142 that represents the flow of fluid through the solenoid assembly 12 as the plunger 84 travels from its non-actuated state to its fully actuated state.

Figure 5:
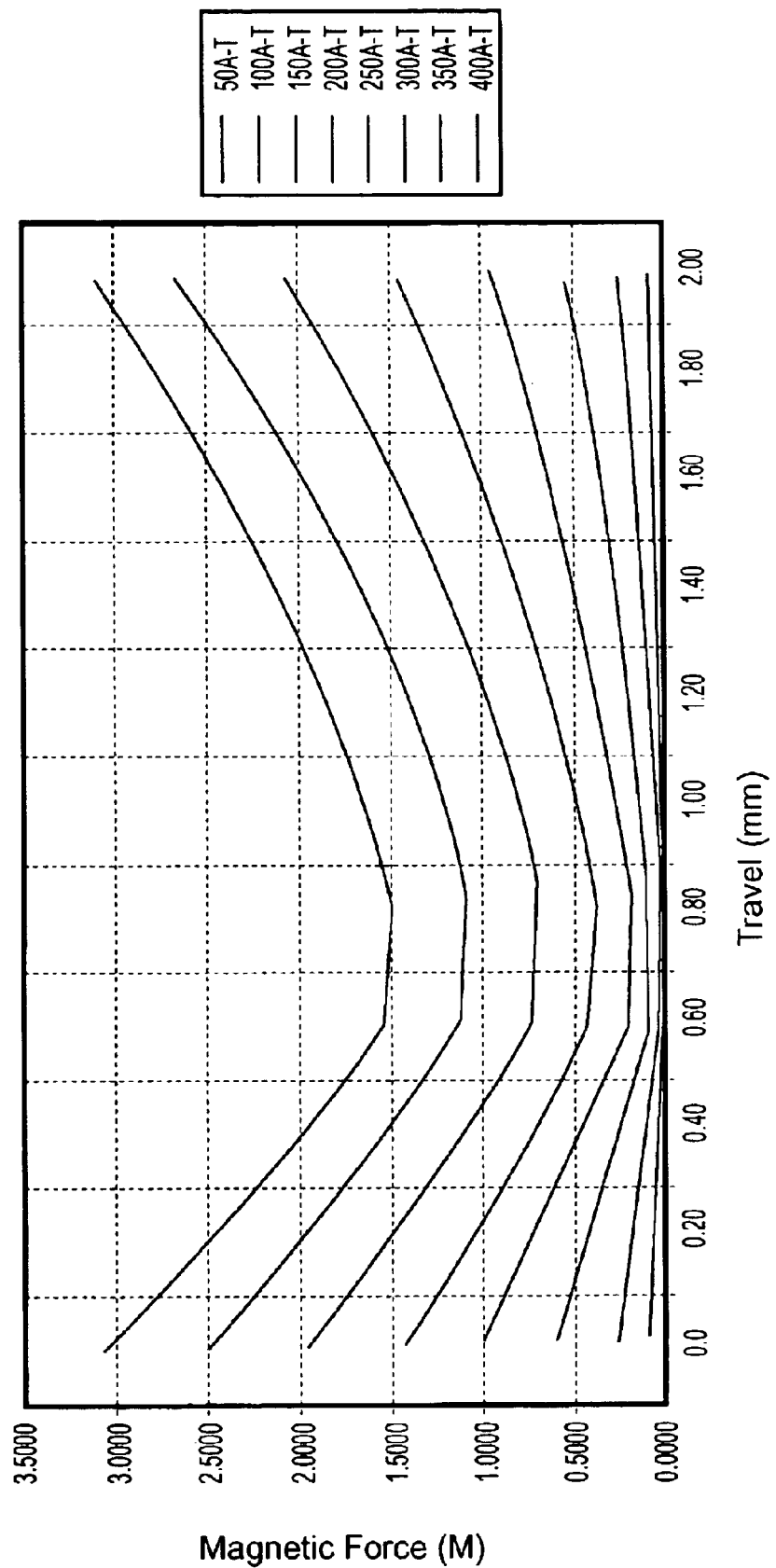
FIG. 5 is a graphic representation of the magnetic force as a function of travel of the plunger having magnetic fields of varying strength.

FIG. 5 represents the magnetic force generated by the solenoid assembly 12 based on the number of Ampere-turns created by the wire coil 94. As may be seen, as the Ampere-turns increase, the magnetic force generated by the solenoid assembly 12 more represents a shape that can be described as "boat-shaped" because it has converging slopes at either end with a flat portion in the middle thereof. This shows that the magnetic force is greater at either end of the travel of the plunger 84 and it is reduced in the middle portion when the relief portion 112 of the flux extension 108 is fully complimentary to the flux recess 118 of the flux concentrating cylinder 72. More specifically, when the relief portion 112 and the flux recess 118 are aligned with each other, i.e., when a plunger flange 119 of the plunger 84 is as far from a flux extension flange 121 as possible, the reluctance of the solenoid assembly 112 is maximized.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

What is claimed is:

1. A solenoid assembly comprising:
a solenoid frame extending between a first end and a second end;
a primary plate disposed adjacent said first end of said solenoid frame, said primary plate including a flux concentrating cylinder extending out therefrom;
a secondary plate disposed adjacent said second end of said solenoid frame;
a bobbin disposed within said solenoid frame between said primary and secondary plates, said bobbin having a wire coil disposed thereon and defining a core, wherein said core is hollow, said wire coil receiving an electric current to induce a magnetic field thereabout; and
a plunger extendable through a portion of said core of said bobbin and movable at a defined force with respect thereto in response to changes in said magnetic field, said plunger including a flux extension feature extending out therefrom coaxially with said plunger, said flux extension feature including a reduced diameter relief portion cut out of an outside diameter of said flux extension feature to change the force created by said plunger as it moves through said core.

2. A solenoid assembly as set forth in claim 1 wherein said flux concentrating cylinder includes a flux recess extending along a portion thereof complementing said reduced diameter relief portion of said flux extension feature to further control the force created by said plunger as it moves through said core.

3. A solenoid assembly as set forth in claim 2 wherein said flux extension feature extends between a plunger end fixedly secured to said plunger and a distal end extending away from said plunger.

4. A solenoid assembly as set forth in claim 3 wherein said reduced diameter relief portion of said flux extension feature extends between said plunger end and said distal end.

5. A solenoid assembly as set forth in claim 4 wherein said flux concentrating cylinder extends between a plate end fixedly secured to said primary plate and an inward end extending inwardly inside said core.

6. A solenoid assembly as set forth in claim 5 wherein said flux recess extends between said plate end and said inward end.

7. A solenoid assembly as set forth in claim 6 wherein said secondary plate includes a core boss extending out therefrom inside said core.

8. A solenoid assembly as set forth in claim 7 including a plunger spring disposed between said secondary plate and said plunger to bias said plunger toward said primary plate.

9. A solenoid assembly as set forth in claim 8 including a rod fixedly secured to said plunger and extending out past said primary plate coaxially with said core.

10. A solenoid assembly comprising:
- a solenoid frame extending between a first end and a second end;
- a primary plate disposed adjacent said first end of said solenoid frame;
- a secondary plate disposed adjacent said second end of said solenoid frame;
- a bobbin disposed within said solenoid frame between said primary and secondary plates, said bobbin having a wire coil disposed thereon to receive an electric current to induce a magnetic field thereabout, said bobbin also defining a core, wherein said core is hollow;
- a plunger extendable through a portion of said core of said bobbin and movable at a defined force with respect thereto in response to changes in said magnetic field; and
- a flux concentrating cylinder fixedly secured to said primary plate extending out therefrom coaxially with said core and including a flux recess extending along a portion thereof to change the force created by said plunger as it moves through said core.

11. A solenoid assembly as set forth in claim 10 including a flux extension feature fixedly secured to and extending out of said plunger, said flux extension feature positioned to affect said magnetic field as it relates to said flux concentrating cylinder.

12. A solenoid assembly as set forth in claim 11 wherein said flux extension feature includes a reduced diameter relief portion cut out from an outside diameter of said flux extension feature to cooperate with said recess of said flux concentrating cylinder to control the force created by said plunger as it moves through said core.

13. A solenoid assembly as set forth in claim 12 wherein said flux extension feature extends between a plunger end fixedly secured to said plunger and a distal end extending away from said plunger.

14. A solenoid assembly as set forth in claim 13 wherein said flux recess extends along a portion of said flux concentrating cylinder such that said flux recess complements said reduced diameter relief portion of said flux extension feature to further control the force created by said plunger as it moves through said core.

15. A solenoid assembly as set forth in claim 14 wherein said flux concentrating cylinder extends between a plate end fixedly secured to said primary plate and an inward end extending inwardly inside said core.

16. A solenoid assembly as set forth in claim 15 wherein said reduced diameter relief portion of said flux extension feature is between said plunger end and said distal end.

17. A solenoid assembly as set forth in claim 16 wherein said flux recess extends between said plate end and said inward end.

18. A solenoid assembly as set forth in claim 17 wherein said secondary plate includes a core boss extending out therefrom inside said core.

19. A solenoid assembly as set forth in claim 18 including a plunger spring disposed between said secondary plate and said plunger to bias said plunger toward said primary plate.

* * * * *